US00RE42522E

(19) United States
(12) Reissued Patent
Zimmel et al.

(10) Patent Number: US RE42,522 E
(45) Date of Reissued Patent: Jul. 5, 2011

(54) RUGGEDIZED FIBER OPTIC CONNECTION

(75) Inventors: Steven C. Zimmel, Minneapolis, MN (US); Trevor D. Smith, Eden Prairie, MN (US); Michael J. Shorter, Lonsdale, MN (US)

(73) Assignee: ADC Telecommunications, Inc., Eden Prairie, MN (US)

(21) Appl. No.: 11/981,850

(22) Filed: Oct. 31, 2007

Related U.S. Patent Documents

Reissue of:
(64) Patent No.: 6,962,445
Issued: Nov. 8, 2005
Appl. No.: 10/658,739
Filed: Sep. 8, 2003

(51) Int. Cl.
*G02B 6/38* (2006.01)

(52) U.S. Cl. ..... 385/55; 439/587

(58) Field of Classification Search ..... 385/53, 385/55, 60, 70–72, 78, 88, 89, 92, 94; 439/271, 439/274, 587, 589
See application file for complete search history.

(56) References Cited

U.S. PATENT DOCUMENTS

| | | | |
|---|---|---|---|
| 2,950,338 | A | 8/1960 | Taylor |
| 4,140,366 | A | 2/1979 | Makuch et al. |
| 4,140,367 | A | 2/1979 | Makuch et al. |
| 4,142,776 | A | 3/1979 | Cherin et al. |
| 4,174,882 | A | 11/1979 | McCartney |
| 4,225,214 | A | 9/1980 | Hodge et al. |
| 4,279,467 | A | 7/1981 | Borsuk et al. |
| 4,291,943 | A | 9/1981 | Binek et al. |
| 4,339,171 | A | 7/1982 | Makuch et al. |
| 4,354,731 | A | 10/1982 | Mouissie |
| 4,447,120 | A | 5/1984 | Borsuk |
| 4,448,478 | A | 5/1984 | Matthews |
| 4,515,434 | A | 5/1985 | Margolin et al. |

(Continued)

FOREIGN PATENT DOCUMENTS

DE 35 37 684 A1 4/1987

(Continued)

OTHER PUBLICATIONS

Stratos Lightwave™ Brochure, "HQLC Hermaphroditic Butt Joint Connector," 2 pages (Undated).

(Continued)

*Primary Examiner* — Thanh-Tam T Le
(74) *Attorney, Agent, or Firm* — Merchant & Gould P.C.

(57) ABSTRACT

A fiber optic cable connection system comprising a first fiber optic connector including a ferrule within which an optical fiber is mounted and a fiber optic adapter for receiving the first fiber optic connector including a sleeve for receiving the ferrule. The first fiber optic connector is mounted within a first threaded body with the fiber optic cable extending through an opening in a distal end of the first threaded body and the ferrule accessible through a proximal end of the first threaded body. The fiber optic adapter is mounted within a second threaded body and the second threaded body adapted for mounting to a bulkhead. The second threaded body adapted to engage the proximal end of the first threaded body with the first connector engaging the adapter and the ferrule extending into the sleeve. An outer housing is threadably mounted about both the first and second threaded bodies when the second threaded body is engaging the proximal end of the first threaded body. The first and second threaded bodies and the outer housing cooperate to hold the first connector engaging the adapter.

22 Claims, 9 Drawing Sheets

U.S. PATENT DOCUMENTS

| | | | |
|---|---|---|---|
| 4,611,887 | A | 9/1986 | Glover et al. |
| 4,615,581 | A | 10/1986 | Morimoto |
| 4,648,688 | A | 3/1987 | Ashman et al. |
| 4,684,205 | A | 8/1987 | Margolin et al. |
| 4,687,291 | A | 8/1987 | Stape et al. |
| 4,705,352 | A | 11/1987 | Margolin et al. |
| 4,715,675 | A | 12/1987 | Kevern et al. |
| 4,725,120 | A | 2/1988 | Parzygnat |
| 4,787,706 | A | 11/1988 | Cannon, Jr. et al. |
| 4,793,683 | A | 12/1988 | Cannon, Jr. et al. |
| 4,815,810 | A | 3/1989 | Betzler et al. |
| 4,820,185 | A | 4/1989 | Moulin |
| 4,846,564 | A | 7/1989 | Caron et al. |
| 4,854,664 | A | 8/1989 | McCartney |
| 4,902,238 | A | 2/1990 | Iacobucci |
| 4,907,853 | A | 3/1990 | Hiratsuka |
| 4,961,623 | A | 10/1990 | Midkiff et al. |
| 4,964,688 | A | 10/1990 | Caldwell et al. |
| 4,974,925 | A | 12/1990 | Troutman et al. |
| 4,979,792 | A | 12/1990 | Weber et al. |
| 5,016,968 | A | 5/1991 | Hammond et al. |
| 5,042,901 | A | 8/1991 | Merriken et al. |
| 5,076,656 | A | 12/1991 | Briggs et al. |
| 5,096,276 | A | 3/1992 | Gerace et al. |
| 5,101,463 | A | 3/1992 | Cubukciyan et al. |
| 5,104,242 | A | 4/1992 | Ishikawa |
| 5,121,458 | A | 6/1992 | Nilsson et al. |
| 5,123,071 | A | 6/1992 | Mulholland et al. |
| 5,129,023 | A | 7/1992 | Anderson et al. |
| 5,134,677 | A | 7/1992 | Leung et al. |
| 5,136,672 | A | 8/1992 | Mulholland et al. |
| 5,142,601 | A | 8/1992 | Shibata et al. |
| 5,157,749 | A | 10/1992 | Briggs et al. |
| 5,166,995 | A | 11/1992 | Briggs et al. |
| 5,202,942 | A | 4/1993 | Collins et al. |
| 5,210,810 | A | 5/1993 | Darden et al. |
| 5,212,752 | A | 5/1993 | Stephenson et al. |
| 5,214,731 | A | 5/1993 | Chang et al. |
| 5,214,732 | A | 5/1993 | Beard et al. |
| 5,214,830 | A | 6/1993 | Rozycki |
| 5,222,169 | A | 6/1993 | Chang et al. |
| 5,259,052 | A | 11/1993 | Briggs et al. |
| 5,263,105 | A | 11/1993 | Johnson et al. |
| 5,265,181 | A | 11/1993 | Chang |
| 5,267,342 | A | 11/1993 | Takahashi et al. |
| 5,268,982 | A | 12/1993 | Schaffer et al. |
| 5,271,080 | A | 12/1993 | Hopper et al. |
| 5,276,750 | A | 1/1994 | Manning |
| 5,283,848 | A | 2/1994 | Abendschein et al. |
| 5,293,581 | A | 3/1994 | DiMarco |
| 5,293,582 | A | 3/1994 | Beard et al. |
| 5,313,540 | A | 5/1994 | Ueda et al. |
| 5,315,679 | A | 5/1994 | Baldwin et al. |
| 5,317,663 | A | 5/1994 | Beard et al. |
| 5,363,459 | A | 11/1994 | Hultermans |
| 5,367,594 | A | 11/1994 | Essert et al. |
| 5,390,270 | A | 2/1995 | Hanzawa et al. |
| 5,392,373 | A | 2/1995 | Essert |
| 5,394,497 | A | 2/1995 | Erdman et al. |
| 5,418,874 | A | 5/1995 | Carlisle et al. |
| 5,428,703 | A | 6/1995 | Lee |
| 5,450,517 | A | 9/1995 | Essert |
| 5,465,313 | A | 11/1995 | Belenkiy et al. |
| 5,475,782 | A | 12/1995 | Ziebol |
| 5,481,634 | A | 1/1996 | Anderson et al. |
| 5,548,677 | A | 8/1996 | Kakii et al. |
| 5,569,050 | A | 10/1996 | Lloyd |
| 5,577,145 | A | 11/1996 | Musk |
| 5,590,229 | A | 12/1996 | Goldman et al. |
| 5,633,970 | A | 5/1997 | Olson et al. |
| 5,636,306 | A | 6/1997 | Mock et al. |
| 5,638,474 | A | 6/1997 | Lampert et al. |
| 5,668,906 | A | 9/1997 | Yamamura et al. |
| 5,682,450 | A | 10/1997 | Patterson et al. |
| 5,682,451 | A | 10/1997 | Lee et al. |
| 5,715,342 | A | 2/1998 | Nodfelt et al. |
| 5,732,174 | A | 3/1998 | Carpenter et al. |
| 5,751,874 | A | 5/1998 | Chudoba |
| 5,778,122 | A | 7/1998 | Giebel et al. |
| 5,806,175 | A | 9/1998 | Underwood |
| 5,809,192 | A | 9/1998 | Manning et al. |
| 5,862,289 | A | 1/1999 | Walter et al. |
| 5,887,095 | A | 3/1999 | Nagase |
| 5,892,870 | A | 4/1999 | Fingler et al. |
| 5,896,477 | A * | 4/1999 | Stephenson et al. ..... 385/53 |
| 5,905,832 | A | 5/1999 | Alfille et al. |
| 5,909,526 | A | 6/1999 | Roth et al. |
| 5,920,669 | A | 7/1999 | Knecht et al. |
| 5,923,804 | A | 7/1999 | Rosson |
| 5,923,805 | A | 7/1999 | Anderson et al. |
| 5,940,559 | A | 8/1999 | Noll |
| 5,946,436 | A | 8/1999 | Takashi |
| 5,971,625 | A | 10/1999 | Lu |
| 5,980,118 | A | 11/1999 | Henningsson et al. |
| 5,984,532 | A | 11/1999 | Tamaki et al. |
| 5,993,070 | A | 11/1999 | Tamekuni et al. |
| 5,993,071 | A | 11/1999 | Hultermans |
| 6,022,150 | A | 2/2000 | Erdman et al. |
| 6,079,881 | A | 6/2000 | Roth |
| 6,149,313 | A | 11/2000 | Giebel et al. |
| 6,151,432 | A | 11/2000 | Nakajima et al. |
| RE37,028 | E | 1/2001 | Cooke et al. |
| 6,173,097 | B1 | 1/2001 | Throckmorton et al. |
| 6,178,283 | B1 | 1/2001 | Weigel |
| 6,179,475 | B1 | 1/2001 | Takamatsu et al. |
| 6,179,482 | B1 | 1/2001 | Takizawa et al. |
| 6,186,670 | B1 | 2/2001 | Austin et al. |
| 6,188,822 | B1 | 2/2001 | McAlpine et al. |
| RE37,079 | E | 3/2001 | Stephenson et al. |
| RE37,080 | E | 3/2001 | Stephenson et al. |
| 6,206,579 | B1 | 3/2001 | Selfridge et al. |
| 6,224,270 | B1 | 5/2001 | Nakajima et al. |
| 6,234,683 | B1 | 5/2001 | Waldron et al. |
| 6,234,685 | B1 | 5/2001 | Carlisle et al. |
| 6,254,278 | B1 | 7/2001 | Andrews et al. |
| 6,261,006 | B1 | 7/2001 | Selfridge |
| 6,264,374 | B1 | 7/2001 | Selfridge et al. |
| 6,298,190 | B2 | 10/2001 | Waldron et al. |
| 6,302,594 | B1 | 10/2001 | Lee |
| 6,305,849 | B1 | 10/2001 | Roehrs et al. |
| 6,350,063 | B1 | 2/2002 | Gilliland et al. |
| 6,357,929 | B1 | 3/2002 | Roehrs et al. |
| 6,371,660 | B1 | 4/2002 | Roehrs et al. |
| 6,379,054 | B2 | 4/2002 | Throckmorton et al. |
| 6,419,399 | B1 | 7/2002 | Loder et al. |
| 6,419,402 | B1 | 7/2002 | Zimmel |
| 6,422,764 | B1 | 7/2002 | Marrs |
| 6,427,035 | B1 | 7/2002 | Mahony |
| 6,428,215 | B1 | 8/2002 | Nault |
| 6,431,783 | B2 | 8/2002 | Nakajima et al. |
| 6,435,732 | B1 | 8/2002 | Asao et al. |
| 6,461,057 | B2 | 10/2002 | Chen |
| 6,466,725 | B2 | 10/2002 | Battey et al. |
| 6,496,641 | B1 | 12/2002 | Mahony |
| 6,508,594 | B1 | 1/2003 | Bruland |
| 6,522,804 | B1 | 2/2003 | Mahony |
| 6,539,147 | B1 | 3/2003 | Mahony |
| 6,540,410 | B2 | 4/2003 | Childers et al. |
| 6,542,674 | B1 | 4/2003 | Gimblet |
| 6,546,175 | B1 | 4/2003 | Wagman et al. |
| 6,550,977 | B2 * | 4/2003 | Hizuka ..... 385/55 |
| 6,568,861 | B2 | 5/2003 | Benner et al. |
| 6,575,640 | B2 | 6/2003 | Connelly et al. |
| 6,579,014 | B2 | 6/2003 | Melton et al. |
| 6,599,026 | B1 | 7/2003 | Fahrnbauer et al. |
| 6,614,980 | B1 | 9/2003 | Mahony et al. |
| 6,619,697 | B2 | 9/2003 | Griffioen et al. |
| 6,619,859 | B1 | 9/2003 | Minamino et al. |
| 6,625,375 | B1 | 9/2003 | Mahony |
| 6,629,782 | B2 | 10/2003 | McPhee et al. |
| 6,648,520 | B2 | 11/2003 | McDonald et al. |
| 6,652,156 | B2 | 11/2003 | Shinagawa et al. |
| 6,655,851 | B1 | 12/2003 | Lee |
| 6,663,292 | B1 | 12/2003 | Shirakawa |
| 6,668,127 | B1 | 12/2003 | Mahony |
| 6,672,774 | B2 | 1/2004 | Theuerkorn et al. |
| 6,678,448 | B2 | 1/2004 | Moisel et al. |

6,685,361 B1 2/2004 Rubino et al.
6,695,489 B2 2/2004 Nault
6,702,478 B2 3/2004 Inagaki et al.
6,705,764 B2 3/2004 Shang
6,714,710 B2 3/2004 Gimblet
6,729,773 B1 5/2004 Finona et al.
6,738,555 B1 5/2004 Cooke et al.
6,739,759 B1 5/2004 Seeley
6,767,141 B1 7/2004 Dudek et al.
6,783,281 B2 8/2004 Cheng
6,785,450 B2 8/2004 Wagman et al.
6,789,950 B1 9/2004 Loder et al.
6,809,265 B1 10/2004 Gladd et al.
6,816,662 B2 11/2004 Doss et al.
6,817,902 B2 11/2004 Bernardi et al.
6,821,024 B2 * 11/2004 Bates, III ..... 385/76
6,832,856 B2 12/2004 Chiu et al.
6,848,836 B2 2/2005 Ueda et al.
6,854,895 B2 2/2005 Coffey et al.
6,863,446 B2 * 3/2005 Ngo ..... 385/72
6,899,467 B2 5/2005 McDonald et al.
6,909,821 B2 6/2005 Ravasio et al.
6,916,120 B2 7/2005 Zimmel et al.
6,918,703 B2 7/2005 Chen et al.
6,918,704 B2 7/2005 Marrs et al.
6,962,445 B2 11/2005 Zimmel et al.
6,974,265 B2 12/2005 Chiu et al.
7,011,454 B2 3/2006 Caveney et al.
7,025,507 B2 4/2006 de Marchi
7,035,513 B2 4/2006 Mohler et al.
7,044,650 B1 5/2006 Tran et al.
7,050,692 B2 5/2006 Harlan et al.
7,074,066 B2 7/2006 Pepe
7,076,144 B2 7/2006 Loder et al.
7,079,734 B2 7/2006 Seddon et al.
7,090,406 B2 8/2006 Melton et al.
7,090,407 B2 8/2006 Melton et al.
7,093,983 B2 8/2006 Taira et al.
7,111,990 B2 9/2006 Melton et al.
7,113,679 B2 9/2006 Melton et al.
7,114,857 B1 10/2006 Kayner et al.
7,121,731 B2 10/2006 Weynant et al.
7,121,732 B2 10/2006 Pimpinella et al.
7,137,742 B2 11/2006 Theuerkorn et al.
7,146,090 B2 12/2006 Vo et al.
7,150,567 B1 12/2006 Luther et al.
7,165,893 B2 1/2007 Schmitz
7,175,352 B2 2/2007 De Marchi
7,178,990 B2 2/2007 Caveney et al.
7,182,522 B2 2/2007 Sasaki et al.
7,184,634 B2 2/2007 Hurley et al.
7,201,518 B2 4/2007 Holmquist
7,204,644 B2 4/2007 Barnes et al.
7,206,482 B2 4/2007 Rhyne et al.
7,207,727 B2 4/2007 Tran et al.
7,210,855 B2 5/2007 Rossi et al.
7,213,975 B2 5/2007 Khemakhem et al.
7,220,061 B2 5/2007 De Marchi
7,228,047 B1 6/2007 Szilagyi et al.
7,234,875 B2 6/2007 Krowiak et al.
7,234,876 B2 6/2007 Ohtsu et al.
7,234,877 B2 6/2007 Sedor
7,239,812 B2 7/2007 Hung et al.
7,244,066 B2 7/2007 Theuerkorn
7,255,486 B2 8/2007 Cox et al.
7,255,490 B2 8/2007 Zhang et al.
7,264,401 B2 9/2007 Johnson
7,264,402 B2 9/2007 Theuerkorn et al.
7,278,791 B2 10/2007 Demaret et al.
7,281,856 B2 10/2007 Grzegorzewska et al.
7,290,941 B2 11/2007 Kiani et al.
7,292,763 B2 11/2007 Smith et al.
7,317,863 B2 1/2008 Lu et al.
7,326,087 B2 2/2008 Gerlach et al.
7,331,719 B2 2/2008 Manning et al.
RE40,150 E 3/2008 Ishibashi et al.
7,346,256 B2 3/2008 Marrs et al.
7,347,627 B2 3/2008 Saito et al.
7,369,738 B2 5/2008 Larson et al.
7,371,014 B2 5/2008 Willis et al.
7,380,992 B2 6/2008 Kramer et al.
7,460,750 B2 12/2008 Durrant et al.
7,463,803 B2 12/2008 Cody et al.
7,467,896 B2 12/2008 Melton et al.
7,481,585 B2 1/2009 Scadden et al.
7,572,065 B2 8/2009 Lu et al.
7,591,595 B2 9/2009 Lu et al.
7,614,797 B2 11/2009 Lu et al.
7,677,814 B2 3/2010 Lu et al.
7,686,519 B2 3/2010 Lu
7,722,258 B2 5/2010 Lu et al.
7,744,286 B2 6/2010 Lu et al.
7,744,288 B2 6/2010 Lu et al.
7,762,726 B2 7/2010 Lu et al.
2001/0012428 A1 8/2001 Nakajima et al.
2001/0036345 A1 11/2001 Gimblet et al.
2002/0022392 A1 2/2002 Below et al.
2002/0062978 A1 5/2002 Sakabe et al.
2002/0081077 A1 6/2002 Nault
2002/0164130 A1 11/2002 Elkins, II et al.
2003/0063867 A1 4/2003 McDonald et al.
2003/0081905 A1 5/2003 Bethea et al.
2003/0094298 A1 5/2003 Morrow et al.
2003/0095754 A1 5/2003 Matsumoto et al.
2003/0095780 A1 5/2003 Chang
2004/0017983 A1 1/2004 Chen et al.
2004/0033028 A1 2/2004 Cheng
2004/0038588 A1 2/2004 Bernardi et al.
2004/0047566 A1 3/2004 McDonald et al.
2004/0120663 A1 6/2004 Lail et al.
2004/0223699 A1 11/2004 Melton et al.
2004/0223720 A1 11/2004 Melton et al.
2004/0228589 A1 11/2004 Melton et al.
2005/0041928 A1 2/2005 Zimmel et al.
2005/0064752 A1 3/2005 Serino
2005/0100286 A1 5/2005 Cox
2005/0117850 A1 6/2005 Milette
2005/0232553 A1 10/2005 Holmquist
2005/0254757 A1 11/2005 Ferretti, III et al.
2006/0056769 A1 3/2006 Khemakhem et al.
2006/0088247 A1 4/2006 Tran et al.
2006/0088248 A1 4/2006 Tran et al.
2006/0089049 A1 4/2006 Sedor
2006/0115219 A1 6/2006 Mudd et al.
2007/0025665 A1 2/2007 Dean, Jr. et al.
2007/0077010 A1 4/2007 Melton et al.
2008/0044137 A1 2/2008 Luther et al.
2008/0131132 A1 6/2008 Solheid et al.
2008/0175541 A1 7/2008 Lu et al.
2008/0175542 A1 7/2008 Lu et al.
2008/0175546 A1 7/2008 Lu et al.
2008/0273840 A1 11/2008 Lu et al.
2008/0310796 A1 12/2008 Lu
2009/0003772 A1 1/2009 Lu et al.
2009/0041411 A1 2/2009 Melton et al.
2009/0060423 A1 3/2009 Melton et al.
2009/0148101 A1 6/2009 Lu et al.
2009/0148102 A1 6/2009 Lu et al.
2009/0148103 A1 6/2009 Lu et al.
2009/0148104 A1 6/2009 Lu et al.
2009/0162016 A1 6/2009 Lu et al.
2010/0034502 A1 2/2010 Lu et al.

FOREIGN PATENT DOCUMENTS

DE 10 2004 049 697 A1 4/2006
EP 0 156 075 A2 10/1985
EP 0 345 519 A2 12/1989
EP 0 547 778 A1 6/1993
EP 0 581 527 A1 2/1994
EP 0 689 069 A1 12/1995
EP 0 468 671 B1 1/1996
EP 0 762 171 A1 3/1997
EP 0 848 267 A2 6/1998
EP 0 855 610 A2 7/1998
EP 0 856 761 A1 8/1998
EP 0 940 700 A2 9/1999
EP 0 949 522 A2 10/1999
EP 0 997 757 A2 5/2000

| | | | |
|---|---|---|---|
| EP | 1 065 542 | A1 | 1/2001 |
| EP | 1 258 758 | A2 | 11/2002 |
| EP | 1 333 537 | A1 | 8/2003 |
| EP | 1 457 793 | A2 | 9/2004 |
| EP | 1 566 674 | A1 | 8/2005 |
| GB | 2 154 333 | A | 9/1985 |
| JP | 52-30447 | | 3/1977 |
| JP | 58-142308 | | 8/1983 |
| JP | 62-54204 | | 3/1987 |
| JP | 4-44607 | | 4/1992 |
| JP | 5-106765 | | 4/1993 |
| JP | 8-62432 | | 3/1996 |
| JP | 9-135526 | | 5/1997 |
| JP | 9-159867 | | 6/1997 |
| JP | 10-160969 | | 6/1998 |
| JP | 11-160579 | | 6/1999 |
| JP | 2000-292653 | | 10/2000 |
| JP | 2001-116968 | | 4/2001 |
| JP | 2003-195103 | | 7/2003 |
| JP | 2005-114860 | | 4/2005 |
| JP | 2006-146084 | | 6/2006 |
| WO | WO 94/15232 | | 7/1994 |
| WO | WO 94/25885 | | 11/1994 |
| WO | WO 00/31575 | | 6/2000 |
| WO | WO 01/27660 | A2 | 4/2001 |
| WO | WO 01/92937 | A1 | 12/2001 |
| WO | WO 03/073819 | A2 | 9/2003 |
| WO | WO 2005/072395 | A2 | 8/2005 |
| WO | WO 2005/101078 | A1 | 10/2005 |

OTHER PUBLICATIONS

Stratos Lightwave™ Brochure, "HDLC Hermaphroditic Butt Joint Connector," 2 pages (Undated).

Delphi Connection Systems, "Harsh Environment Hermaphroditic Fiber Optic Connectors," 16 pages (© 2002).

U.S. Appl. No. 60/607,696, filed Sep. 7, 2004 entitled "Optical Transceiver Module with Environmentally Sealed, Hardened, Strain Relieved and Shielded Adapter for Outside Plant Cable Assemblies".

Mikon Series ST-III Multimode and Singlemode Connectors, 2 pages (Publicly known at least as early as Jan. 2, 1992).

U.S. Appl. No. 11/607,676, filed Dec. 1, 2006 entitled "Network Interface Device".

U.S. Appl. No. 11/657,402, filed Jan. 24, 2007 entitled "Hardened Fiber Optic Connector".

U.S. Appl. No. 11/657,403, filed Jan. 24, 2007 entitled "Fiber Optic Connector Mechanical Interface Converter".

U.S. Appl. No. 11/657,404, filed Jan. 24, 2007 entitled "Hardened Fiber Optic Connector".

Office Action mailed Jan. 11, 2008 in U.S. Appl. No. 11/657,402.

Office Action mailed Jan. 17, 2008 in U.S. Appl. No. 11/657,403.

Opti Tap™ Connector. An Evolant Solutions Product, 2 pages (Sep. 2005).

U.S. Appl. No. 12/115,966, filed May 6, 2008 entitled "Mechanical Interface Converter for Making Non-Ruggedized Fiber Optic Connectors Compatible with a Ruggedized Fiber Optic Adapter".

U.S. Appl. No. 12/115,982, filed May 6, 2008 entitled "Interface Converter for SC Fiber Optic Connectors".

U.S. Appl. No. 12/203,508, filed Sep. 3, 2008 entitled "Hardened Fiber Optic Connector Compatible with Hardened and Non-Hardened Fiber Optic Adapters".

U.S. Appl. No. 12/203,522, filed Sep. 3, 2008 entitled "Hardened Fiber Optic Connection System".

U.S. Appl. No. 12/203,530, filed Sep. 3, 2008 entitled "Hardened Fiber Optic Connection System with Multiple Configurations".

U.S. Appl. No. 12/203,535, filed Sep. 3, 2008 entitled "Hardened Fiber Optic Connector and Cable Assembly with Multiple Configurations".

U.S. Appl. No. 12/825,082, filed Jun. 28, 2010 entitled "Hardened Fiber Optic Connection System with Multiple Configurations".

U.S. Appl. No. 12/825,111, filed Jun. 28, 2010 entitled "Hardened Fiber Optic Connector Compatible with Hardened and Non-Hardened Fiber Optic Adapters".

U.S. Appl. No. 12/843,692, filed Jul. 26, 2010 entitled "Hardened Fiber Optic Connection System".

U.S. Final Office Action cited in U.S. Appl. No. 11/657,404 mailed Jan. 7, 2009.

U.S. Non-Final Office Action cited in U.S. Appl. No. 11/657,404 mailed Apr. 16, 2008.

U.S. Non-Final Office Action cited in U.S. Appl. No. 12/203,508 mailed Jun. 25, 2009.

U.S. Non-Final Office Action cited in U.S. Appl. No. 12/203,522 mailed Jun. 24, 2009.

U.S. Non-Final Office Action cited in U.S. Appl. No. 12/203,530 mailed Jul. 16, 2009.

U.S. Non-Final Office Action cited in U.S. Appl. No. 12/203,535 mailed Aug. 2, 2010.

U.S. Non-Final Office Action cited in U.S. Appl. No. 12/333,509 mailed Mar. 18, 2010.

U.S. Non-Final Office Action cited in U.S. Appl. No. 12/564,752 mailed Aug. 5, 2010.

* cited by examiner

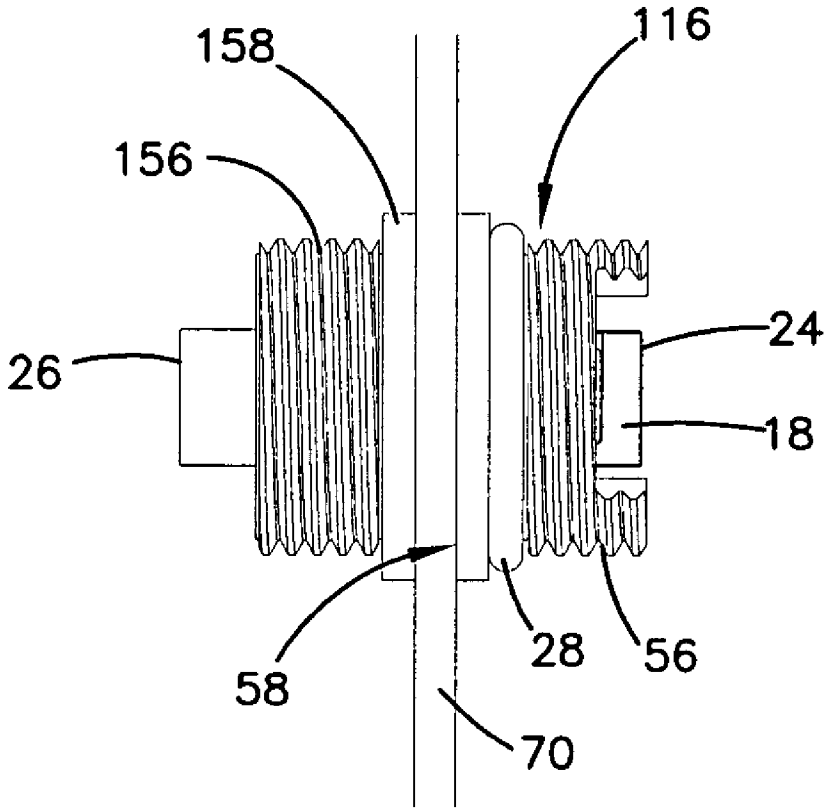
AMENDED
FIG.11A

RUGGEDIZED FIBER OPTIC CONNECTION

Matter enclosed in heavy brackets [ ] appears in the original patent but forms no part of this reissue specification; matter printed in italics indicates the additions made by reissue.

FIELD OF THE INVENTION

The present invention relates generally to fiber optic connectors and adapters. More specifically, the present invention relates to a ruggedized housing for securely connecting and environmentally sealing fiber optic connectors and adapters.

BACKGROUND

In telecommunications networks, optical fiber service connections to customers are becoming more popular. As the use of optical fiber is extended to more customers directly, the need for improved optical fiber connectors that are able to withstand adverse environmental conditions has increased. Known optical fiber connector and adapter combinations are suitable for connecting optical fiber cables but are not well suited to withstanding adverse weather conditions. Ruggedized fiber optic connection systems are desirable.

In existing telecommunications installations, it is known to have overhead cables providing service to customers. Other service connections or drops also potentially place the service drop cable under some amount of tension or strain. For such service connections, it is known to use an armored cable or a drop cable with added strength members. In conjunction with such service drops, it is desirable to provide drop cable connections which are capable of withstanding the tension or strain exerted by the cable. It is also desirable that these drop cable connections be made with standardized connector and adapter combinations for consistency with other optical fiber connectors and adapters in use in the telecommunications network.

It is also desirable that these drop cable connections be made in the field without the need for field termination of the cables.

SUMMARY

The present invention relates to a fiber optic cable connection system comprising a first fiber optic connector including a ferrule within which an optical fiber is mounted and a fiber optic adapter for receiving the first fiber optic connector including a sleeve for receiving the ferrule. The first fiber optic connector is mounted within a first threaded body with the fiber optic cable extending through an opening in a distal end of the first threaded body and the ferrule accessible through a proximal end of the first threaded body. The fiber optic adapter is mounted within a second threaded body and the second threaded body adapted for mounting to a bulkhead. The second threaded body adapted to engage the proximal end of the first threaded body with the first connector engaging the adapter and the ferrule extending into the sleeve. An outer housing is threadably mounted about both the first and second threaded bodies when the second threaded body is engaging the proximal end of the first threaded body. The first and second threaded bodies and the outer housing cooperate to hold the first connector engaging the adapter.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 11A is a side view of an alternative bulkhead assembly mounted to a bulkhead.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

FIGS. 1 to 5 show a fiber optic connection system 10 for connecting a service drop cable 12 or other cable to a fiber optic telecommunications network. System 10 provides weather or harsh environment protection to a optical fiber connection housed within system 10. System 10 also provides a degree of resistance to tension from cable 12 which may be acting to pull a connector 22 from an adapter 18 within system 10.

Figure 3:
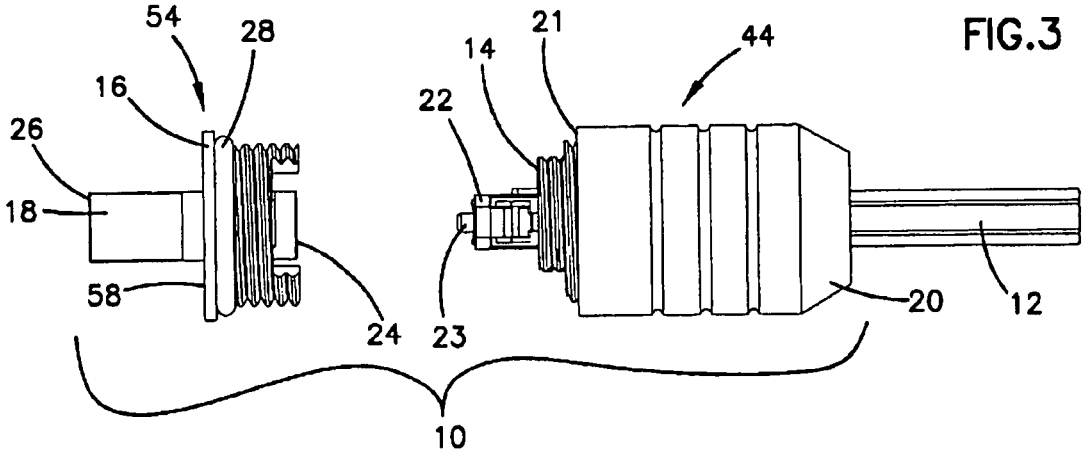
FIG. 3 is a side view of the fiber optic connection system of FIG. 2, with the first and second threaded bodies separated from each other.
Figure 2:
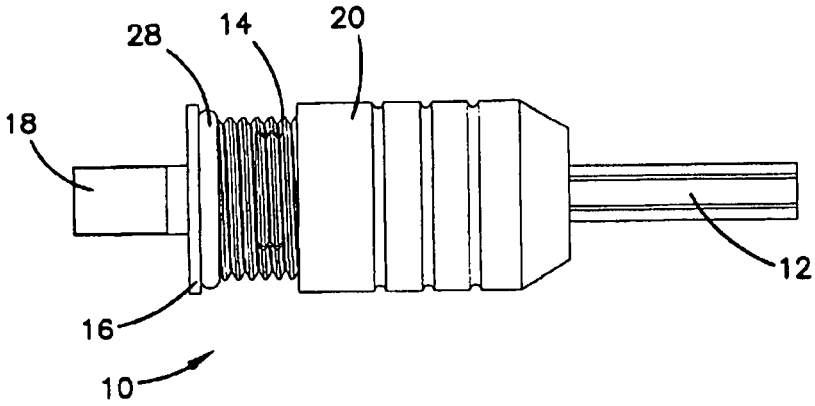
FIG. 2 is a side view of the fiber optic connection system of FIG. 1, with an outer housing partially unthreaded from about first and second threaded bodies.
Figure 1:
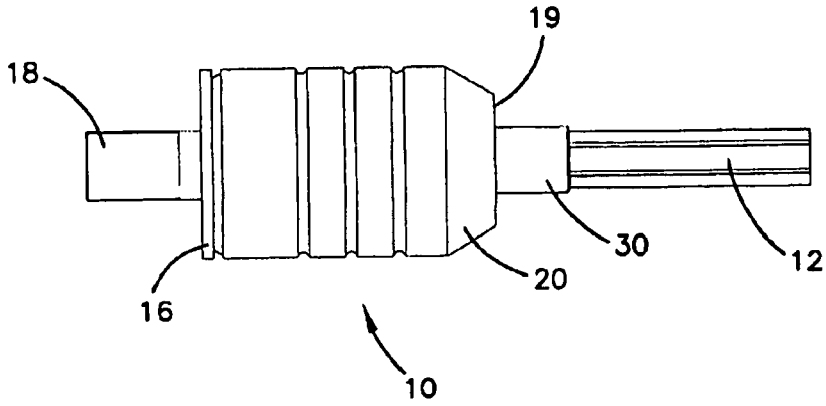
FIG. 1 is a side view of a fiber optic connection system according to the present invention.

Referring now to FIGS. 1 to 3, connector 22 is mounted within a cable end assembly 44 and adapter 18 is mounted to a bulkhead assembly 54. Also included in cable end assembly 44 are an outer housing 20 threaded received about a first threaded body 14. Cable end assembly 44 also includes a cable mount 30 to which cable 12 is physically connected and to which connector 22 is mounted. Cable mount 30 extends within first threaded body 14 and through outer housing 20.

Bulkhead assembly [56] *54* includes adapter 18 having a first end 24 for receiving an optical fiber connector such as connector 22 and a second end 26. Second end 26 as shown in also configured to receive a fiber optic connector such as connector 22. While both ends 24 and 26 are shown configured to receive a standard SC connector, it is anticipated that other styles and formats of optical fiber connectors may be used with the present invention. It is also anticipated that first end 24 and second end 26 may receive different format or style optical fiber connectors. Bulkhead assembly [56] *54* also includes a second threaded body 16 through which adapter 18 is mounted. Second threaded body 16 includes a rear face 58 which adapted to fit against an outer wall of a bulkhead with second end 26 and first end 24 of adapter 18 on opposite sides of the bulkhead. As system 10 is adapted to seal the connector 22 within first end 24 of adapter 18 against tension and adverse environmental effects, it is anticipated that first end 22 will be positioned on the side of the bulkhead most likely to be subjected to such conditions. Examples of such an installation include mounting bulkhead assembly [56] *54* to an outer wall of a junction box housing mounted atop a utility pole.

First threaded body 14 and second threaded body 16 engage each other, as will be described further below, and form a continuous thread for outer housing 20 to threadably engage. A first end 21 of outer housing 20 engages an o-ring 28 mounted about first threaded body 16 opposite rear face 58. O-ring 28 forms a weather resistant seal between first end 21 of outer housing 20 and second threaded body 16. As will be described further below, a second o-ring 34 (shown in FIG. 5) about cable mount 30 is engaged by a second end of outer housing 20 to provide a weather resistant seal between outer housing 20 and first threaded body 14.

Connector 22 includes a ferrule 23 where an end of an optical fiber of cable 12 is terminated. Adapter 18 includes a sleeve 42 within a central opening 32 sized to receive ferrule 23 when connector 22 is received within first end 24 of adapter 18. Sleeve 42 also extends within second opening 26 to receive a ferrule of a fiber optic connector inserted within second end 26 of adapter 18. The ferrule of two connectors inserted within the two ends of adapter 18 aligned with each other within central opening 32 so that optical signals may be transferred between the cables terminated at each of the ferrules. Adapter 18 and connector 22 are described in further detail in U.S. Pat. No. 5,317,663, the disclosure of which is incorporated herein by reference. U.S. Pat. No. 5,317,663 describes an SC type connector and adapter.

Figure 5:
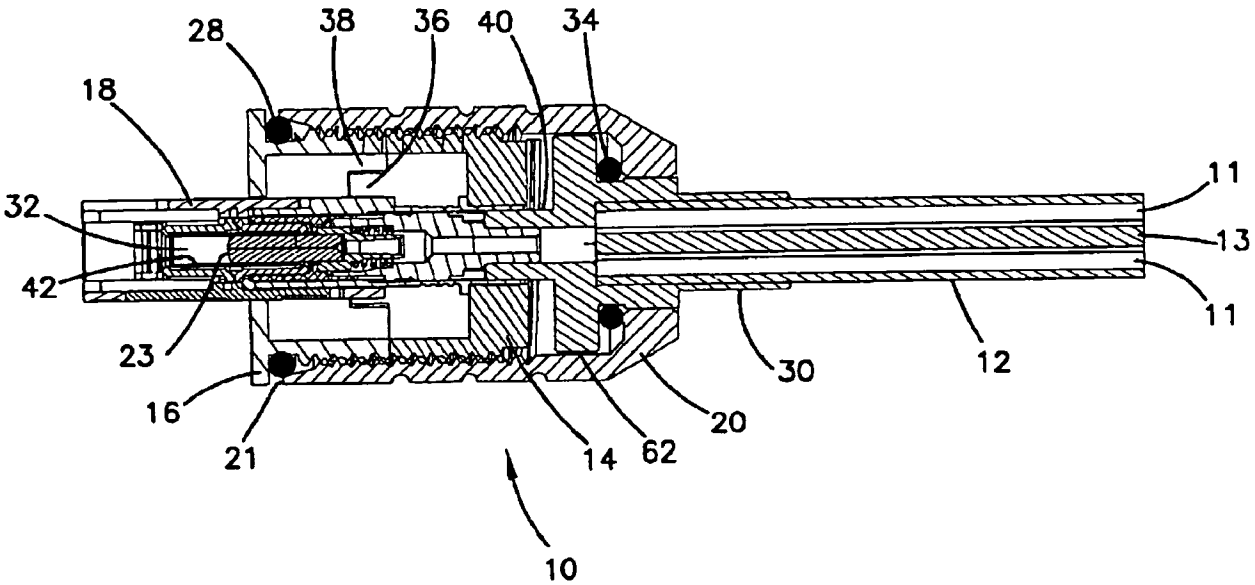
FIG. 5 is a cross-sectional side view of the fiber optic connection system of FIG. 1.
Figure 4:
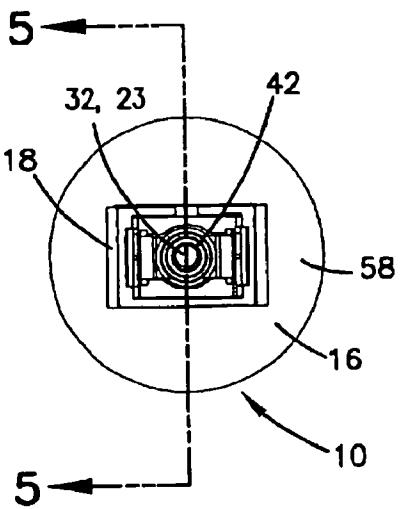
FIG. 4 is an end view of the side view of the fiber optic connection system of FIG. 1.
Figure 6:
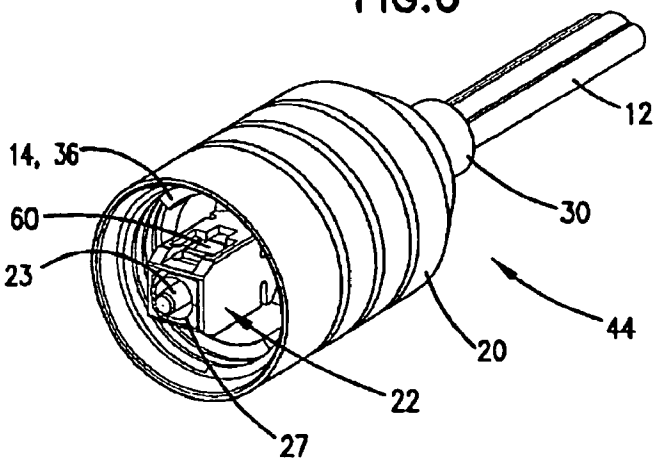
FIG. 6 is a perspective view of a cable end assembly of the fiber optic connection system of FIG. 1.
Figure 7:
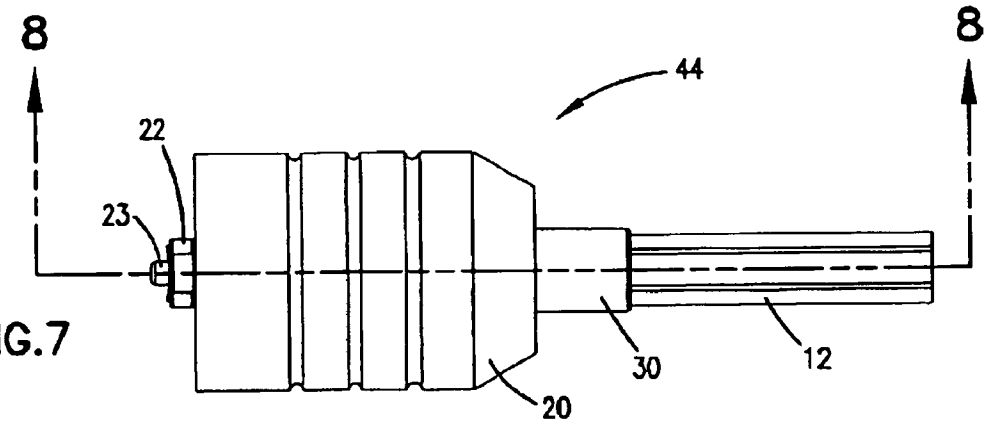
FIG. 7 is a side view of the cable end assembly of FIG. 6.
Figure 8:
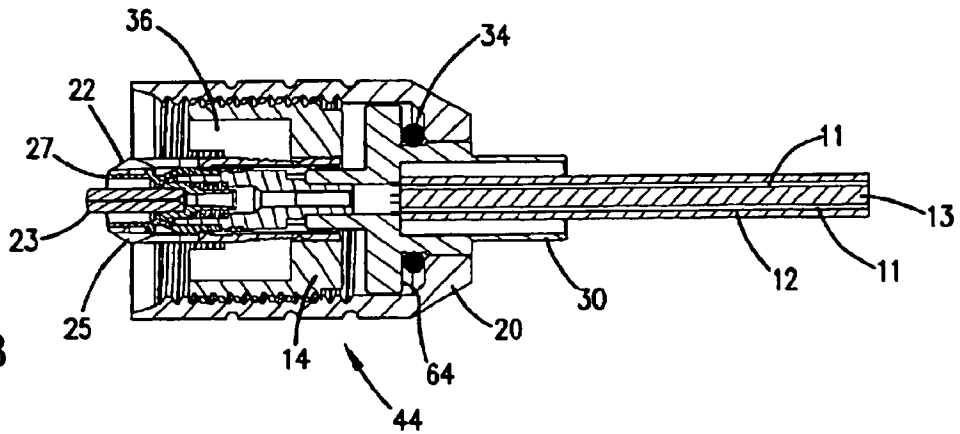
FIG. 8 is a cross-sectional side view of the cable end assembly of FIG. 6.
Figure 9:
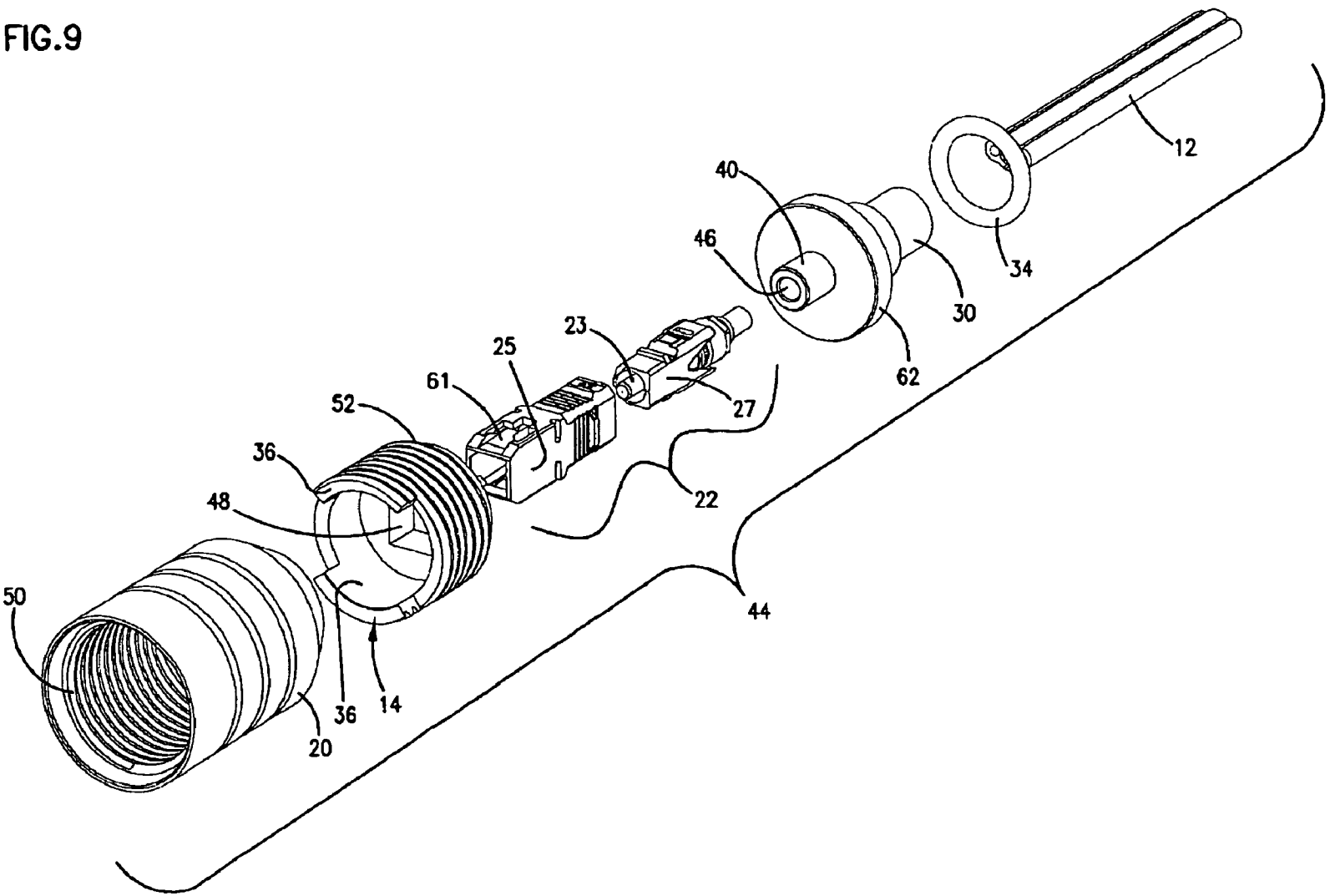
FIG. 9 is an exploded perspective view of the cable end assembly of FIG. 6.

FIGS. 4 and 5 show rear face 58 about adapter 18 of system 10. Central opening 32 is axially aligned with sleeve 42 and ferrule 23 is positioned within sleeve 42. O-ring 34 is positioned about cable mount 30. Cable mount 30 also includes a central shaft 40 about which outer housing 20 is rotatably positioned. A shoulder 62 defines the widest portion of cable mount 30 and is closely matched in size to an inner diameter of outer housing 20 while still allowing free movement and rotation of outer housing 20 about cable mount 30. A keyed feature 36 of first threaded body 14 engages a second interlocking keyed feature 38 of second threaded body 16. An optical fiber (not shown) extends within a central opening 13 of cable 12 and extends through cable mount 30 and connector 22 to terminate at ferrule 23. Additional openings 11 in cable 12 provide passage for strength members to extend. These strength members are physically attached to cable mount 30 when cable 12 is terminated at cable end assembly 44.

FIGS. 6 to 9 show first threaded body [12] *14* of cable end assembly 44 including threads 52 on an outer wall and threads 50 on an inner wall of outer housing 20. Threads 50 and 52 mesh with each other. First threaded body 14 includes a central opening 48 sized to receive a outer shell 25 of connector 22 so that shell 25 is fixed rotationally and longitudinally with respect to first threaded body 14. Cable mount 30 includes a central opening 46 axially aligned with ferrule 23 of connector 22 so that the optical fiber from cable 12 may extend to ferrule 23. Connector 22 also includes an inner shell 27 to which ferrule 23 is mounted and which is in turn mounted within opening 46 of cable mount 30. Outer shell 25 also includes recesses 61 for receiving catches 60 of adapter 18 (described below with regard to FIG. 12). Keyed feature 36 of threaded body 14 is configured such that second threaded body 16 and adapter 18 may be engaged in only one rotational orientation.

Figure 10:
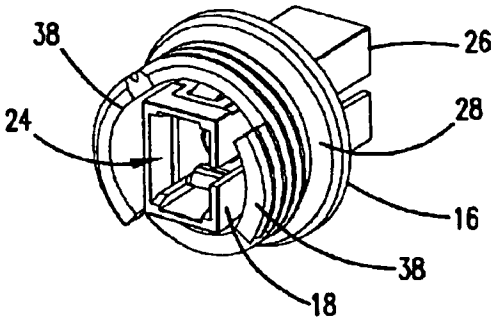
FIG. 10 is a perspective view of the bulkhead assembly of the fiber optic connection system of FIG. 1.
Figure 11:
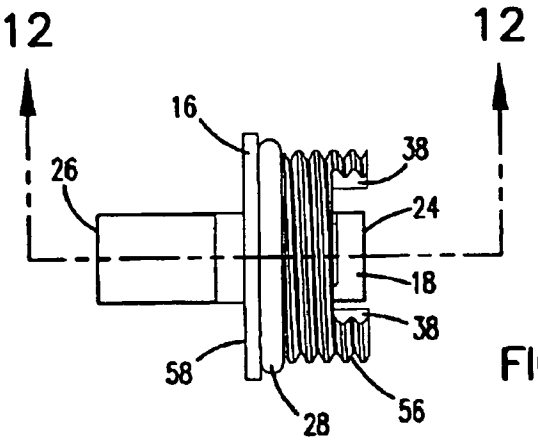
FIG. 11 is a side view of the bulkhead assembly of FIG. 10.
Figure 12:
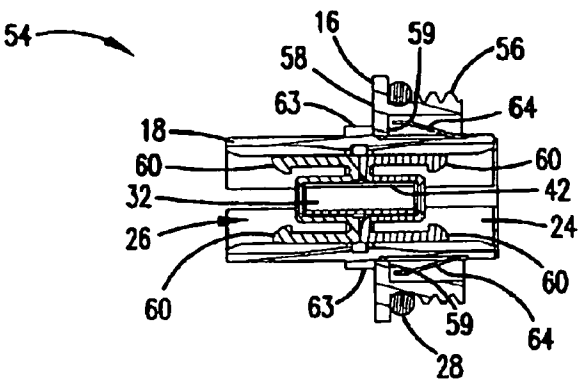
FIG. 12 is a cross-sectional side view of the bulkhead assembly of FIG. 10.
Figure 15:
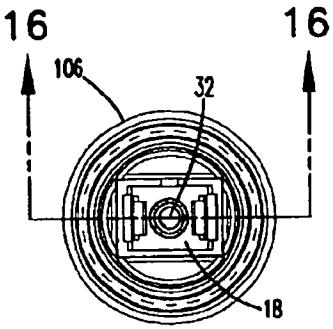
FIG. 15 is an end view of an adapter body for use with the fiber optic connection system of FIG. 13.

FIGS. 10 to 12 show bulkhead assembly 54 included threads 56 formed about an outer surface of second threaded body 16. Threads 56 are compatible with threads 50 and 52. When first threaded body 14 and second threaded body 16 are aligned such that keyed features 36 and 38 are properly aligned and adapter 18 engages connector 22, threads 52 and 56 are aligned with each other so that threads 50 of outer housing 20 is able to be threaded over both the first and second threaded bodies. Catches 60 within first and second ends 24 and 26 of adapter 18 engage recesses 61 in outer shell 25 of connector 22. Adapter 18 includes a pair of clips [62] *64* which extends from opposite sides of adapter 18 and releasably mounts adapter 18 within second threaded body 16. First end 24 of adapter 18 is inserted through an opening in rear face 58 until clips [62] *64* extend as shown in FIG. 12. Clips 64 engage a front face 59 opposite rear face 58 and a pair of opposing shoulders 63 of adapter 18 engage rear face 58. Clips 64 and shoulders 63 cooperate to mount adapter 18 to second threaded body 16.

Referring now to FIG. 11A, an alternative embodiment second threaded [portion] *body* 116 is shown mounted to a bulkhead 70. Rear face 58 is positioned [againsty] *against* bulkhead 70 and second end 26 of adapter 18 extends through bulkhead 70 to a side opposite first end 24. Second threaded body 116 includes a second threaded portion 156 extending opposite threads 56 through bulkhead 70. A nut 158 is threaded onto second threaded portion 156 and cooperates with rear face 58 to mount second threaded body 116 to bulkhead 70. Other mounting methods are anticipated for mounting second threaded bodies 16 and 116 to bulkhead 70. A clip such as clip 64 may be mounted about the second end of adapter 18 and also cooperate with shoulders 63 to mount second threaded body 16 within an opening in bulkhead 70.

Referring now to FIGS. 13 to 16, a second embodiment 100 of a ruggedized fiber optic connection system. System 100 includes a cable end assembly 102, a bulkhead assembly 104 and an adapter body 106. Mounted within each bulkhead assembly 104 is a connector 22 in a female housing end 118. Mounted within each cable end assembly 102 is another connector 22 in a female housing end 120. Each of these connectors 22 includes a ferrule 23 within which an optical fiber is terminated. Adapter body 106 includes an adapter 18 mounted within and accessible through opposing male housing ends 114. When one of the male housing ends 114 is inserted within one of the female housing ends 118 or 120, the connector 22 within the female housing end is received within one of ends 24 and 26 of adapter 18.

Also, when one of the male housing ends 114 is inserted within one of the female housing ends 118 or 120, a latching mechanism 116 positioned about each of the male housing ends 114 engages mating surfaces (not shown) inside the female housing ends. Latching mechanism 116 and the mating surfaces within the female housing ends releasably and securely hold system 100 together to resist tension from cable 12.

Bulkhead assemblies 104 are mounted to a bulkhead 109 of a service drop housing 108. Within service drop housing 108, a fiber optic cable extends to each bulkhead assembly 104. These interior cables include optical fibers but may or may not include any strength members.

Figure 16:
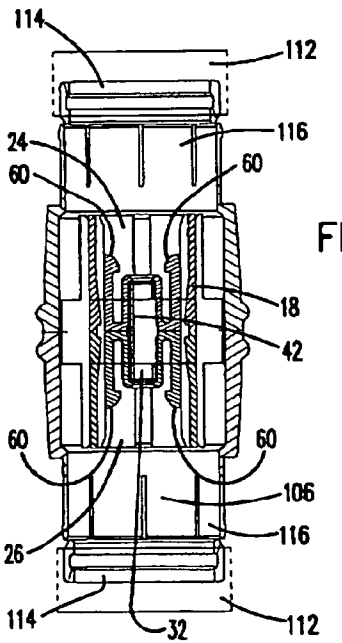
FIG. 16 is a side cross-sectional view of the adapter body of FIG. 15.
Figure 13:
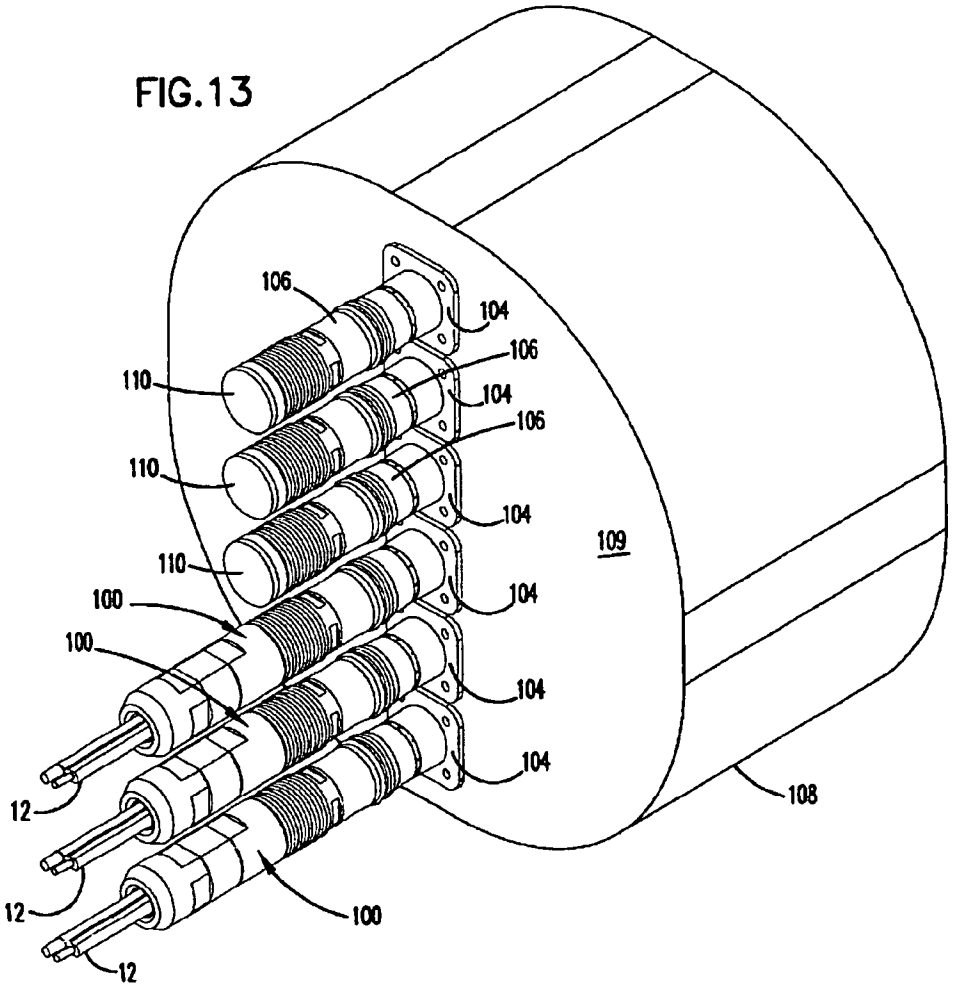
FIG. 13 is a perspective view of a second embodiment of a ruggedized fiber optic connection system in accordance with the present invention.
Figure 14:
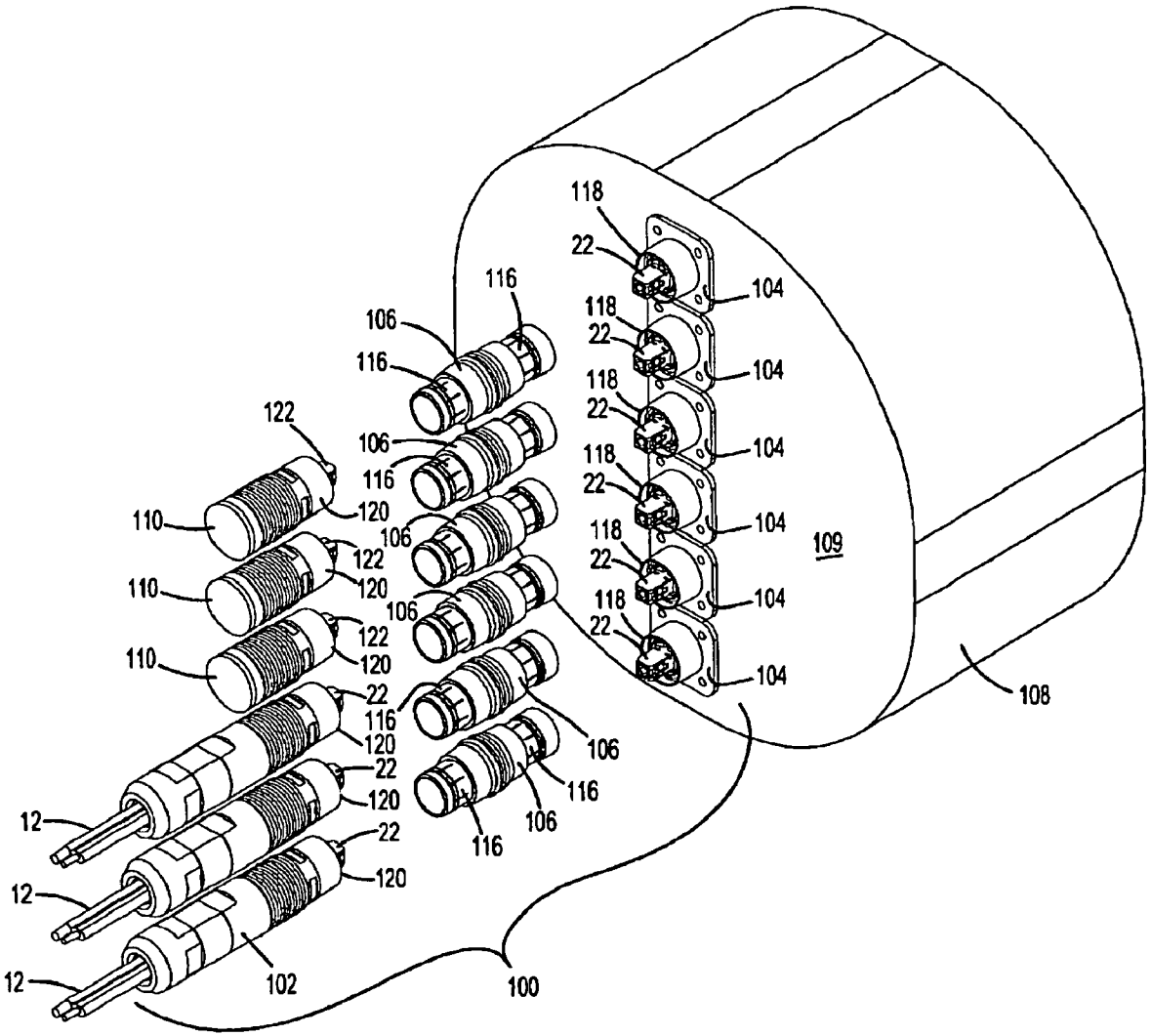
FIG. 14 is an exploded perspective view of the fiber optic connection system of FIG. 13.

Referring to FIGS. 13 and 14, the three topmost bulkhead assemblies 104 have adapter bodies 106 inserted within openings 118. On the opposite end of these adapter bodies 106, a plug assembly 110 is inserted into each of the openings 114. Plug assembly 110 includes the same external surfaces and shape of cable end assembly 102 and includes a connector 122. Connector 122 is identical to connector 22 except that no fiber is terminated within ferrule 23. Plug assembly 110 is adapted to seal opening 118 from adverse weather in the same way that cable end assembly 102 and acts as a placeholder to permit surplus bulkhead assemblies to be placed on housing 108 in anticipation of future expansion of service. Referring now to FIG. 16, note that an end cap 112 is positioned about each of the ends 114 to prevent entry of foreign matter or contaminants within adapter 18.

One of the features of system 100 is that access is provided to the end face of each ferrule holding an optical fiber during installation system 100. For example, to activate a new service drop, assuming that a bulkhead assembly 104 was available for use, a field technician might remove plug assembly 110 from adapter housing 106 and adapter housing 106 from bulkhead assembly 104. The technician could then inspect, and if necessary clean the end face of ferrule 23 of connector 22 within bulkhead assembly 104. Adapter body 106 might then be replaced with end 114 recevied within end 118 and ferrule 23 of connector 22 of bulkhead assembly 104 inserted within sleeve 42. The new service drop cable 12 with a cable end assembly 102 might then be cleaned and inspected for contaminates on ferrule 23. If the drop cable is suitable, end 120 might be inserted within the opposite end 114 of adapter body 106 with ferrule 23 received within sleeve 42. The two ferrules 23 within sleeve 42 are brought into alignment with each other to permit the passage of optical signals from one optical fiber to the other.

Figure 17:
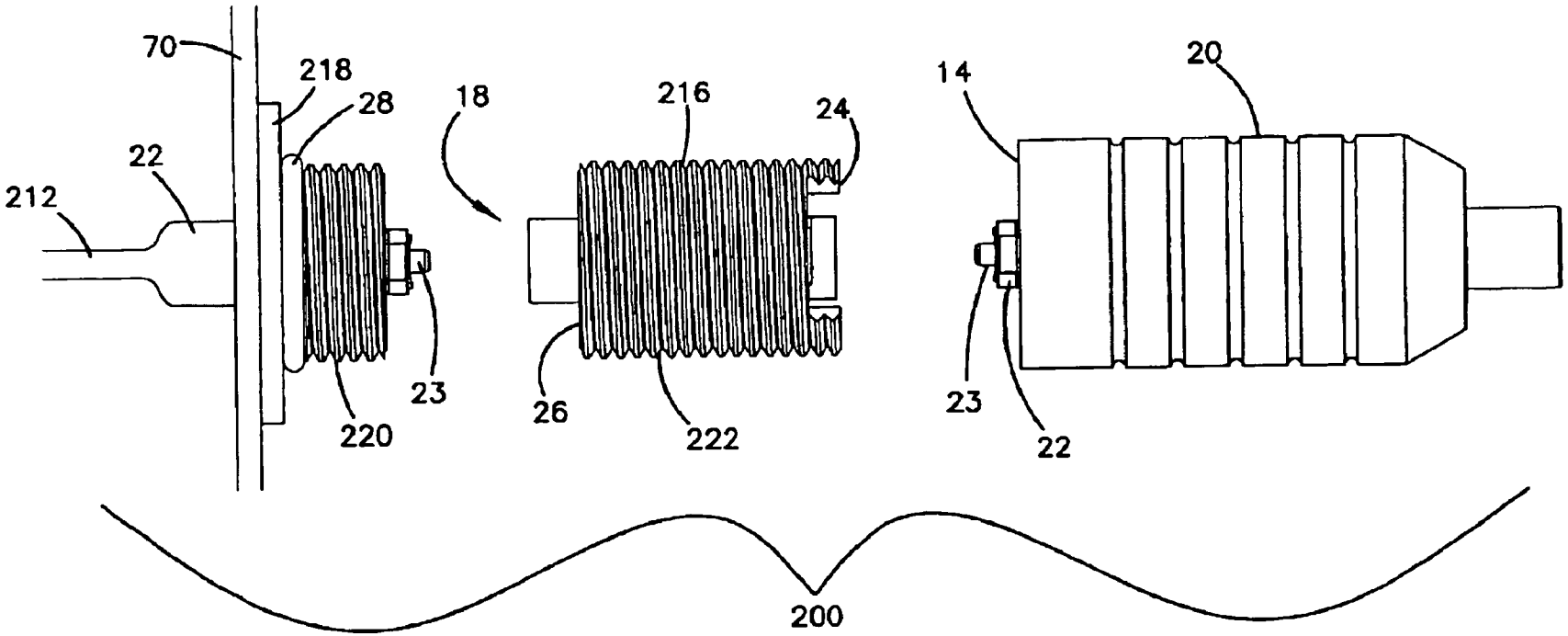
FIG. 17 is side view of a third embodiment of a ruggedized fiber optic cable connection system incorporating features of the first and second embodiments.

It is anticipated that system 100 might be adapted for use with the threaded bodies of system 10. Such a third embodiment system 200 is shown in FIG. 17. System 200 includes first threaded body 14 with a connector 22 attached to cable 12 with outer housing 20 threadably mounted. A second threaded body 216 includes adapter 18 as with the other second threaded bodies described above but is not adapted for mounted to a bulkhead. Second threaded body 216 is threaded end to end with threads 222 for threadably receiving outer housing 20 with ferrule 23 of connector 22 inserted within first end 24. A third threaded body 218 is mounted to bulkhead 70 and includes an adapter 22 mounted to a optical fiber cable 212 and having an optical fiber of cable 212 terminated at a ferrule 23. Third threaded body 218 includes threads 220 for threadably receiving outer housing 20 when ferrule 23 of connector 22 is inserted within second end 26 of adapter 18.

The above specification, examples and data provide a complete description of the manufacture and use of the invention. Since many embodiments of the invention can be made without departing from the spirit and scope of the invention, the invention resides in the claims hereinafter appended.

What is claimed is as follows:

1. A fiber optic cable connection system comprising:

a first fiber optic connector with a first end and a second end, the second end mounted to an end of a fiber optic cable, and the first end including a ferrule within which an optical fiber of the fiber optic cable is mounted;

a fiber optic adapter including a first end for receiving the first fiber optic connector, the first end including a sleeve for receiving the ferrule and aligning the optical fiber within the ferrule with a longitudinal axis of the sleeve;

the first fiber optic connector mounted within a first threaded body with the fiber optic cable extending through an opening in a distal end of the first threaded body and the ferrule accessible through a proximal end of the first threaded body;

the fiber optic adapter mounted within a second threaded body and the second threaded body adapted for mounting to a bulkhead;

the second threaded body adapted to engage the proximal end of the first threaded body with the first end of the first connector engaging the first end of the adapter and the ferrule of the connector extending into the sleeve of the adapter;

an outer housing threadably mounted about both the first and second threaded bodies when the second threaded body is engaging the proximal end of the first threaded body; and the first and second threaded bodies and the outer housing cooperating to hold the first end of the first connector engaging the first end of the adapter.

2. The fiber optic cable connection system of claim 1, wherein the first fiber optic connector is a standardized fiber optic connector and the first end of the adapter is adapted to receive the standardized fiber optic connector.

3. The fiber optic cable connection system of claim 2, wherein the first connector is an SC connector and the first end of the adapter is adapted to receive the SC connector.

4. The fiber optic cable connection system of claim 1, wherein the fiber optic adapter further includes a second end for receiving a second fiber optic connector with a ferrule, the second end including a sleeve for receiving the ferrule of the second connector and aligning an optical fiber within the ferrule of the second connector with the optical fiber within the ferrule of the first connector.

5. The fiber optic cable connection system of claim 4, wherein the second fiber optic connector is a standardized fiber optic connector and the second end of the adapter is adapted to receive the standardized fiber optic connector.

6. The fiber optic cable connection system of claim 5, wherein the second connector is an SC connector and the second end of the adapter is adapted to receive the SC connector.

7. The fiber optic cable connection system of claim 1, wherein a first o-ring is positioned about the fiber optic cable adjacent the distal end of the first threaded body, a second o-ring is positioned about the second threaded body, and the outer housing engages both o-rings to environmentally seal the first ends of the first connector and the adapter.

8. The fiber optic cable connection system of claim 1, wherein the second threaded body is fixedly mounted to a bulkhead and the threaded bodies and the outer housing cooperate to transfer tension from the cable to the bulkhead without disengaging the first end of the first connector from the first end of the adapter.

*9. A fiber optic cable connection system comprising:*

*a fiber optic connector with a first end and a second end, the second end mounted to an end of a fiber optic cable, and the first end including a ferrule within which an optical fiber of the fiber optic cable is mounted;*

*the fiber optic adapter including a first end for receiving the first fiber optic connector, the first end including a*

*sleeve for receiving the ferrule and aligning the optical fiber within the ferrule with a longitudinal axis of the sleeve;*

*a first fastening arrangement for securing the fiber optic connector within the first end of the fiber optic adapter; and*

*a second fastening arrangement for securing the fiber optic connector within the first end of the fiber optic adapter;*

*wherein the first fastening arrangement includes at least one latch member, and the second fastening arrangement includes a threaded coupling.*

*10. The fiber optic cable connection system of claim 9, wherein the at least one latch member is provided at the fiber optic adapter, and wherein the at least one latch member engages a portion of the fiber optic connector to secure the fiber optic connector within the fiber optic adapter.*

*11. The fiber optic cable connection system of claim 9, wherein the threaded coupling includes a threaded member that mounts over the fiber optic connector and is rotatable relative to the fiber optic connector, and wherein the threaded coupling also includes a threaded portion provided at the first end of the fiber optic adapter that threadedly engages the threaded member to secure the fiber optic connector within the fiber optic adapter.*

*12. A fiber optic connector assembly comprising:*

*a plug arrangement including:*

*a first body;*

*at least one shell positioned at least partially within the first body;*

*a ferrule positioned at least partially within the at least one shell;*

*an outer housing positioned around the first body of the plug arrangement, the outer housing defining inner threads;*

*a receptacle arrangement that receives the plug arrangement, the receptacle arrangement including a second body having outer threads, the outer housing and the second body being threaded together through interaction of the inner and outer threads to secure the plug arrangement within the receptacle arrangement; and*

*the at least one shell including a first keying element and the first body including a second keying element, the first and second keying elements interfacing with the receptacle arrangement to ensure that the plug arrangement is inserted into the receptacle arrangement at a predetermined rotational orientation.*

*13. The fiber optic connector assembly of claim 12, wherein the first body is generally cylindrical.*

*14. The fiber optic connector assembly of claim 12, wherein the at least one shell includes an inner shell and an outer shell, and wherein the first keying element is provided on the outer shell.*

*15. The fiber optic connector assembly of claim 14, wherein the first keying element includes a rail.*

*16. The fiber optic connector assembly of claim 12, wherein the second keying element includes a key member that fits within a corresponding key receiver of the receptacle arrangement.*

*17. The fiber optic connector assembly of claim 12, wherein the second keying element includes a key receiver that receives a corresponding key member of the receptacle arrangement.*

*18. The fiber optic connector assembly of claim 17, wherein the plug assembly defines a central longitudinal axis, wherein the key receiver and the first keying element are aligned along a plane that extends along the central longitudinal axis and that bisects the plug assembly, and wherein the key receiver is positioned a further radial distance outward from the central longitudinal axis than the first keying element.*

*19. The fiber optic connector assembly of claim 17, wherein the plug assembly defines a central longitudinal axis, and wherein the key receiver is positioned a further radial distance outward from the central longitudinal axis than the first keying element.*

*20. A fiber optic cable and connector assembly comprising:*

*a fiber optic cable including an optical fiber, the fiber optic cable also including first and second strength members positioned at opposite sides of the optical fiber, the fiber optic cable further including a jacket surrounding the optical fiber and the first and second strength members, the jacket defining an elongate transverse cross-sectional shape;*

*a plug arrangement including:*

*a first body defining a central longitudinal axis, the first body having a front end and a rear end, the front end including two axially extending key members positioned at opposite sides of the central longitudinal axis;*

*a shell positioned at least partially within the first body;*

*a ferrule positioned at least partially within the shell, the ferrule receiving an end of the optical fiber of the fiber optic cable;*

*a spring positioned within the shell for biasing the ferrule in a forward direction;*

*a spring retainer that retains the spring within the shell; and*

*a cable mount including a cable receiving portion positioned rearward of the spring retainer, the first and second strength members of the fiber optic cable being physically attached within the cable receiving portion of the cable mount;*

*an outer housing positioned around the first body of the plug arrangement, the outer housing defining first threads;*

*a receptacle arrangement for receiving the plug arrangement, the receptacle arrangement including a second body, the receptacle arrangement also including a fiber optic adapter that receives an end portion the ferrule when the plug arrangement is inserted within the receptacle arrangement, the fiber optic adapter being positioned at least partially within the second body, the second body including oppositely positioned key receiving portions that receive the key members of the first body to ensure that the plug arrangement is oriented at a predetermined rotational orientation when the plug arrangement is inserted within the receptacle arrangement; and*

*the second body including second threads, the outer housing and the second body being threaded together through interaction of the first and second threads to secure the plug arrangement within the receptacle arrangement.*

*21. The fiber optic cable and connector assembly of claim 20, wherein the jacket defines a first passage for receiving the first strength member and a second passage for receiving the second strength member.*

*22. The fiber optic cable and connector assembly of claim 20, wherein the jacket generally has top and bottom sides interconnected by oppositely positioned curved sides, the top and bottom sides defining a width, the curved sides defining a height, the width being greater than the height.*

* * * * *